United States Patent
Yang

(10) Patent No.: US 8,615,269 B2
(45) Date of Patent: Dec. 24, 2013

(54) MANAGING METHOD AND DEVICE FOR CONFIGURING BASE STATIONS

(75) Inventor: Dongliang Yang, Guangdong Province (CN)

(73) Assignee: ZTE Corporation, Shenzhen (CN)

( * ) Notice: Subject to any disclaimer, the term of this patent is extended or adjusted under 35 U.S.C. 154(b) by 110 days.

(21) Appl. No.: 13/259,675

(22) PCT Filed: Apr. 23, 2010

(86) PCT No.: PCT/CN2010/072160
§ 371 (c)(1),
(2), (4) Date: Dec. 23, 2011

(87) PCT Pub. No.: WO2010/145328
PCT Pub. Date: Dec. 23, 2010

(65) Prior Publication Data
US 2012/0129570 A1 May 24, 2012

(30) Foreign Application Priority Data

Jun. 18, 2009 (CN) .......................... 2009 1 0149099

(51) Int. Cl.
*H04M 1/00* (2006.01)
(52) U.S. Cl.
USPC ......... 455/550.1; 455/524; 455/423; 455/411

(58) Field of Classification Search
USPC ................................ 455/524, 550.1, 423, 411
See application file for complete search history.

(56) References Cited

U.S. PATENT DOCUMENTS

2006/0142026 A1* 6/2006 Al-Baghdadi ............. 455/456.3

FOREIGN PATENT DOCUMENTS

| CN | 1852130 | 10/2006 |
| CN | 101056449 | 10/2007 |
| CN | 101111012 | 1/2008 |
| CN | 101267389 A | 9/2008 |
| JP | 2000-511385 A | 8/2000 |

* cited by examiner

*Primary Examiner* — Barry Taylor
(74) *Attorney, Agent, or Firm* — Vincent K. Gustafson; Jenkins, Wilson, Taylor & Hunt, P.A.

(57) ABSTRACT

The present invention provides a method and an apparatus for managing a base station configuration, wherein the method comprises the following steps of: acquiring identity information of a user (S102); selecting an operation mode corresponding to the identity information of the user (S104); and prompting the user to configure and manage configuration parameters of a base station in the operation mode (S106). The present invention reduces the work of the common maintenance personnel, improves the work efficiency of the common maintenance personnel and saves the operation and maintenance cost.

7 Claims, 7 Drawing Sheets

MANAGING METHOD AND DEVICE FOR CONFIGURING BASE STATIONS

CROSS-REFERENCE TO RELATED APPLICATIONS

This application is the national phase of PCT application PCT/CN2010/072160 having an international filing date of 23 Apr. 2010, which claims benefit of Chinese application No. 200910149099.0 filed 18 Jun. 2009. The contents of the above patent applications are incorporated by reference herein in their entirety.

FIELD OF THE INVENTION

The present invention relates to the field of communication equipment management, and in particular to a method and an apparatus for managing base station configuration.

BACKGROUND OF THE INVENTION

With the rapid development of mobile communication from the first generation of analogue voice service to the second generation of digital voice service, then to the third generation of digital voice and data service, and to wideband and multifunction integrated service after the third generation, complication of design of a base station increases continuously, thereby the demand on the management of base station configuration is further increased.

Configuration and management for a base station is to enable the base station to perform normal operation, and even operate in an optimized condition. The configuration for a base station comprises a physical configuration, a transmission configuration, a radio resource configuration and etc. Engineers perform site start debugging and daily station maintenance for a base station through a Local Maintenance Terminal (LMT for short); and local maintenance personnel perform daily maintenance and update for a base station through an Operation Maintenance Center (OMC for short). The engineers and the maintenance personnel are required to understand configurable parameters of a base station to a certain extent. With the increment of data amount, demand on the engineers and the maintenance personnel is higher, and a difficulty of the configuration and management on the base station is higher.

In the related art, the configuration and the management on the base station have many defects as following.

1. Non-hierarchical management: all configurable data of a foreground is completely exposed to all users of a background, which results in that management of the base station configuration is not definite, thereby increasing workload of the daily maintenance personnel.

2. Inflexible operation: the daily maintenance personnel also need to understand all the configurable parameters of the base station, thereby increasing the difficulty of the daily maintenance, affecting efficiency and increasing the maintenance cost.

Therefore, a solution for managing the base station configuration is required, to solve the problem in the related art above.

SUMMARY OF THE INVENTION

One aspect of the present invention is provided considering the problem in the related art that the maintenance cost is increased due to the increased maintenance difficulty which is caused by the indefinite authority over the management of the base station configuration. Thus, one aspect of the present invention is to provide a solution for managing the base station configuration to solve at least one of the problems above.

According to one aspect of the present invention, a method for managing a base station configuration is provided, which comprises the following steps of: acquiring identity information of a user; selecting an operation mode corresponding to the identity information of the user; and prompting the user to configure and manage configuration parameters of a base station in the operation mode.

Further, the operation mode includes a common mode and an advanced mode.

Further, before the step of acquiring the identity information of the user, the method further comprises: the base station being started in the common mode or the advanced mode; and a LMT or an OMC accessing the base station.

Further, before the step of the LMT or the OMC accessing the base station, the method further comprises: after receiving an access request message from the LMT or the OMC, the base station judging whether to allow the LMT or the OMC to access according to a safety strategy.

Further, the step of selecting an operation mode corresponding to the identity information comprises: the LMT or the OMC selecting the operation mode corresponding to the identity information of the user according to the identify information; and the base station determining whether the operation mode thereof is consistent with that the operation mode of the LMT or the OMC, wherein if not, the base station switches the operation mode thereof to the operation mode of the LMT or the OMC.

Further, in the common mode, configuring daily maintenance parameters is allowed; and in the advanced mode, configuring all changeable parameters or functions is allowed.

Further, the step of the base station being started in the common mode or the advanced mode comprises: the base station being loaded with the identity information and configuration parameters corresponding to the identity information in the common mode and the advanced mode.

According to another aspect of the present invention, an apparatus for managing a base station configuration is provided, which comprises: an acquisition module, adapted to acquire identity information input by a user; a selection module, adapted to select an operation mode corresponding to the identity information; and an operation module, adapted to prompt the user to configure and manage configuration parameters of a base station in the operation mode.

Further, the selection module is further adapted to, in the case that the operation mode is a common mode, allow configuring daily maintenance parameters; and in the case that the operation mode is an advanced mode, allow configuring all changeable parameters or functions.

Further, the apparatus further comprises: a receipt module, adapted to, after the base station is started in a common mode or an advanced mode, receive an access request message from a Local Maintenance Terminal (LMT) or an Operation Maintenance Center (OMC); an access module, adapted to, in the case that the receipt module receives the access request message, access the LMT or the OMC according to a safety strategy; and a switch module, adapted to, in the case that an operation mode of the LMT or the OMC is inconsistent with the operation mode of the base station, switch the operation mode of the base station to the operation mode of the LMT or the OMC.

By the present invention, two different management operation modes including a common mode and an advanced mode are adopted for the base station, which solves the problem in the related art that the maintenance cost is increased due to the increased maintenance difficulty which is caused by the indefinite authority over the management of the base station configuration, simplifies the work of the common maintenance personnel, improves the work efficiency of the common maintenance personnel, saves the cost of operation and maintenance, and strengthens the management of the senior configuration and management personnel for the base station, thereby further optimizing the data of the base station.

The other features and advantages of the present invention will be illustrated hereinafter and will partially become more apparent from the specification or will be understood by implementing the present invention. The purpose and other advantages of the present invention can be realized and obtained through the structure specified in the accompany drawings, specification and claims.

BRIEF DESCRIPTION OF THE DRAWINGS

Accompanying drawings illustrated herein are to provide a further understanding of the present invention, and to constitute a part of the application. The illustrative embodiments of the present invention and explanations thereof are used to explain the present invention, and do not inappropriately limit the present invention. In the accompanying drawings.

DETAILED DESCRIPTION OF EMBODIMENTS

The present invention will be described in detail by reference to the accompanying drawings in combination with embodiments hereinafter. It should be noted that the embodiments in the present invention and the features of the embodiments can be combined with each other if no conflict is caused.

Figure 1:
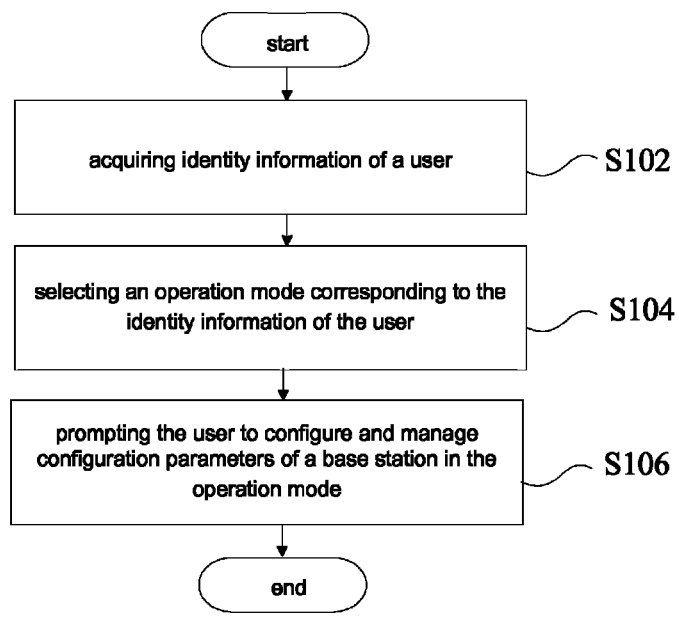
FIG. 1 shows a flowchart of a method for managing a base station configuration according to an embodiment of the present invention.

FIG. 1 shows a flowchart of a method for managing a base station configuration according to an embodiment of the present invention.

With reference to FIG. 1, the method for managing the base station configuration in the embodiment comprises the following steps of: step S102, acquiring identity information of a user; step S104, selecting an operation mode corresponding to the identity information; and step S106, prompting the user to configure and manage configuration parameters of a base station in the operation mode.

Preferably, the operation mode includes a common mode and an advanced mode.

Preferably, before the step S102, the base station can be started in the common mode or the advanced mode, for example, when starting, the base station can be simultaneously loaded with the identity information of the user and corresponding configuration parameters in the common mode and the advanced mode; and a LMT or an OMC accesses the base station. In a specific implementation process, before the step that the LMT or the OMC accesses the base station, the base station receives an access request message from the LMT or the OMC and judges whether to allow the LMT or the OMC to access according to a safety strategy.

Preferably, in the step S104, the LMT or the OMC selects the operation mode corresponding to the identity information according to the identify information; and the base station determines whether an operation mode thereof is consistent with that of the LMT or the OMC, wherein if not, the base station switches the operation mode thereof to the operation mode of the LMT or the OMC.

Preferably, in the common mode, configuring daily maintenance parameters is allowed; and in the advanced mode, configuring all changeable parameters or functions is allowed.

Figure 2:
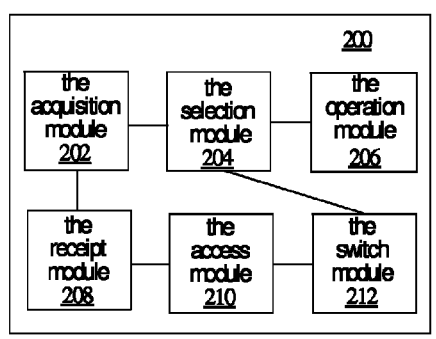
FIG. 2 shows a block diagram of an apparatus for managing a base station configuration according to a preferred embodiment of the present invention.

FIG. 2 shows a block diagram of an apparatus for managing a base station configuration according to a preferred embodiment of the present invention. With reference to FIG. 2, the apparatus 200 for managing the base station configuration comprises: an acquisition module 202, which is adapted to acquire identity information input by a user; a selection module 204, which is coupled to the acquisition module 202 and adapted to select an operation mode corresponding to the identity information; and an operation module 206, which is coupled to the selection module 204 and adapted to prompt the user to configure and manage configuration parameters of a base station in that operation mode.

Preferably, the selection module 204 is further adapted to, in the case that the operation mode is a common mode, allow configuring daily maintenance parameters; and in the case that the operation mode is an advanced mode, allow configuring all changeable parameters or functions.

Preferably, the apparatus further comprises a receipt module 208, which is coupled to the acquisition module 202 and adapted to, after the base station is started in the common mode or the advanced mode, receive an access request message from a LMT or an OMC; an access module 210, which is coupled to the receipt module 208 and adapted to, in the case that the receipt module 208 receives the access request message, access the LMT or the OMC according to a safety strategy; a switch module 212, which is coupled to the access module 210 and the selection module 204 and adapted to, in the case that the selection module 204 determines the operation mode of the LMT or the OMC according to the identity information and that the operation mode of the LMT or the OMC is inconsistent with that of the base station, switch the operation mode of the base station to be consistent with the operation mode of the LMT or the OMC.

In the above embodiments of the present invention, the base station is configured and managed through different management operation modes, so that the configuration and management can satisfy the requirements of different types of staff, thereby solving the problem in the related art that the maintenance cost is increased due to the increased maintenance difficulty which is caused by the indefinite authority over the management of the base station configuration, reducing the workload and the work difficulty of the common maintenance personnel, strengthening the configuration and the management of the advanced maintenance management personnel for the base station, and further improving the accuracy and efficiency of the base station configuration.

An embodiment of the present invention will be described with reference to FIG. 3 hereinafter.

Figure 3:
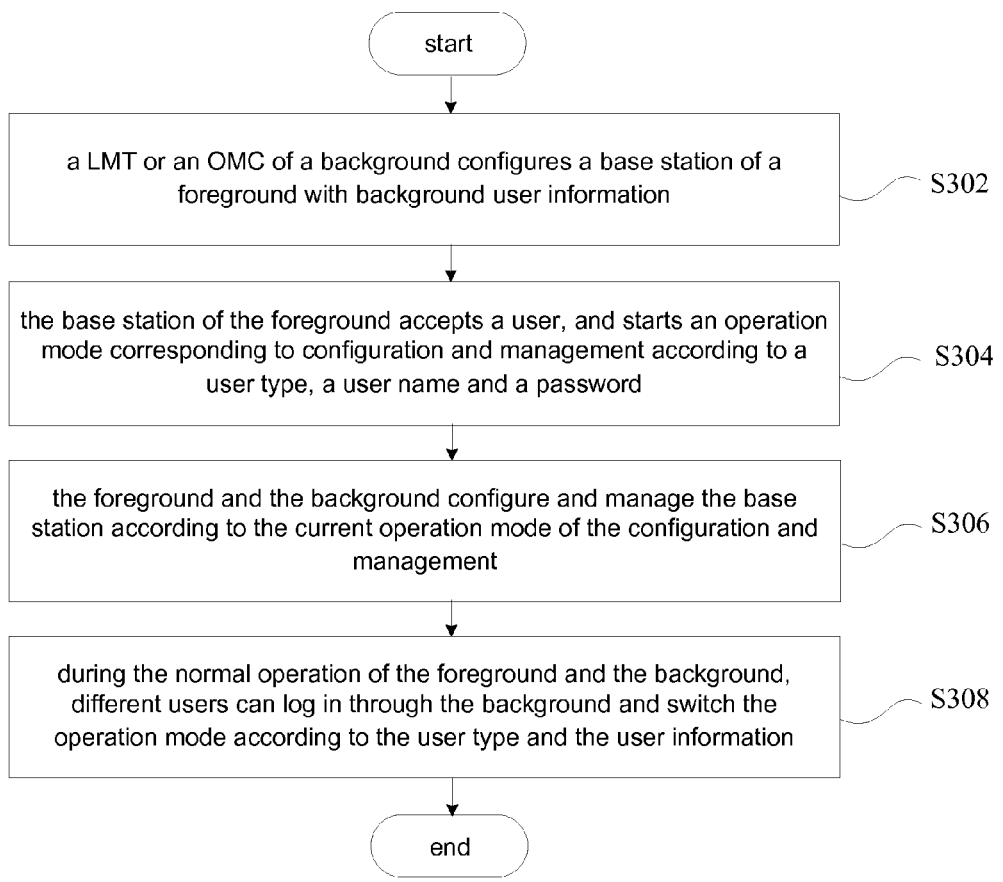
FIG. 3 shows a flowchart of a method for managing a base station configuration according to a preferred embodiment of the present invention.

FIG. 3 shows a flowchart of a method for managing a base station configuration according to a preferred embodiment of the present invention. With reference to FIG. 3, the method for managing the base station configuration in the present embodiment comprises the following steps.

Step S302, a LMT or an OMC of a background (referred to as background hereinafter) configures a base station of a foreground (referred to as foreground hereinafter) with background user information.

Step S304, the base station of the foreground accepts a user, and starts an operation mode corresponding to configuration and management according to a user type, a user name and a password.

Step S306, the foreground and the background configure and manage the base station according to the current operation mode of the configuration and management.

Step S308, during the normal operation of the foreground and the background, different users can log in through the background and switch the operation mode according to the user type and the user information.

In this embodiment, a common mode and an advanced mode are described as examples. Preferably, in other embodiments of the present invention, any other operation modes besides the common mode and the advanced mode can be included, that is, in other embodiments, two or more operation modes can be included.

In a specific implementation process, step S302 can further comprise the following steps.

Step S302-2, the background starts in a default operation mode which is the common mode, and the background pops up a user login dialog.

Step S302-4, a background user can select a common user or an advanced user according to the user type.

Step S302-6, the user name and the user password are input, wherein the selection of the common user can avoid the input of the user name and the user password; and the selection of the advanced user requires the input of the user name and the password.

Step S302-8, the background sends a user login request to the foreground.

Step S302-10, after the user logs in, the background user modifies the user name and the password according to requirement.

Step S302-12, the background sends to the foreground a request of modifying the user name and the password.

In a specific implementation process, step S304 can further comprise the following steps.

Step S304-2, the foreground receives the user login request of the background.

Step S304-4, the foreground compares the user type, the user name and the password according to the stored user information, and judges whether to allow the login.

Step S304-6, if the user information is incorrect, the background is notified of the user information being incorrect.

Step S304-8, if the user information is correct, a configuration and management module of the foreground switches the operation mode of the configuration and the management, and notifies the background after successful switch.

Step S304-10, if the operation mode is failed to switch, it is notified to the background that switching operation mode is not allowed.

Step S304-12, after accepting the user successfully, the foreground receives a request of modifying the user name and the password.

Step S304-14: the foreground judges whether the modifying is legal according to rules, and notifies the background of the result of the judgment.

In a specific implementation process, step S306 further comprises the following steps.

Step S306-2, the background receives a response of successful user login.

Step S306-4, the background performs the switch of operation interface according to the operation mode.

Step S306-6, if the background receives a response of user information being incorrect, the background re-inputs the user information or directly configures and manages the base station in the common mode.

Step S306-8, maintenance personnel sends a corresponding configuration and management request of the base station according to the interface switched by the background.

Step S306-10, the foreground performs a corresponding configuration process according to the configuration and management request.

In a specific implementation process, step S308 can further comprise the following steps.

Step S308-2, a user login is selected through the background.

Step S308-4, after the login is successful, whether to switch the operation mode is judged.

Step S308-6 if the operation mode requires to be switched, the operation interface which is running currently is logout, configuration files of the operation interface are reloaded according to the operation mode, and the operation interface is initialized.

Step S308-8, the initialization after the switching is accomplished.

By the present preferred embodiment, different operation modes are employed for different users, that is, the base station can be configured and managed in the common mode, and all the changeable parameters of the base station can be configured in the advanced mode, thereby enabling the base station to operate in a special or optimized configuration. Therefore, this method simplifies the work operation of the common maintenance personnel, improves the work efficiency of the common maintenance personnel, reduces the cost of operation and maintenance and difficulty of the daily maintenance of the base station, and strengthens the management of the senior configuration and management personnel for the base station.

An implementation process of an embodiment of the present invention will be described in detail by reference to examples hereinafter.

Figure 4:
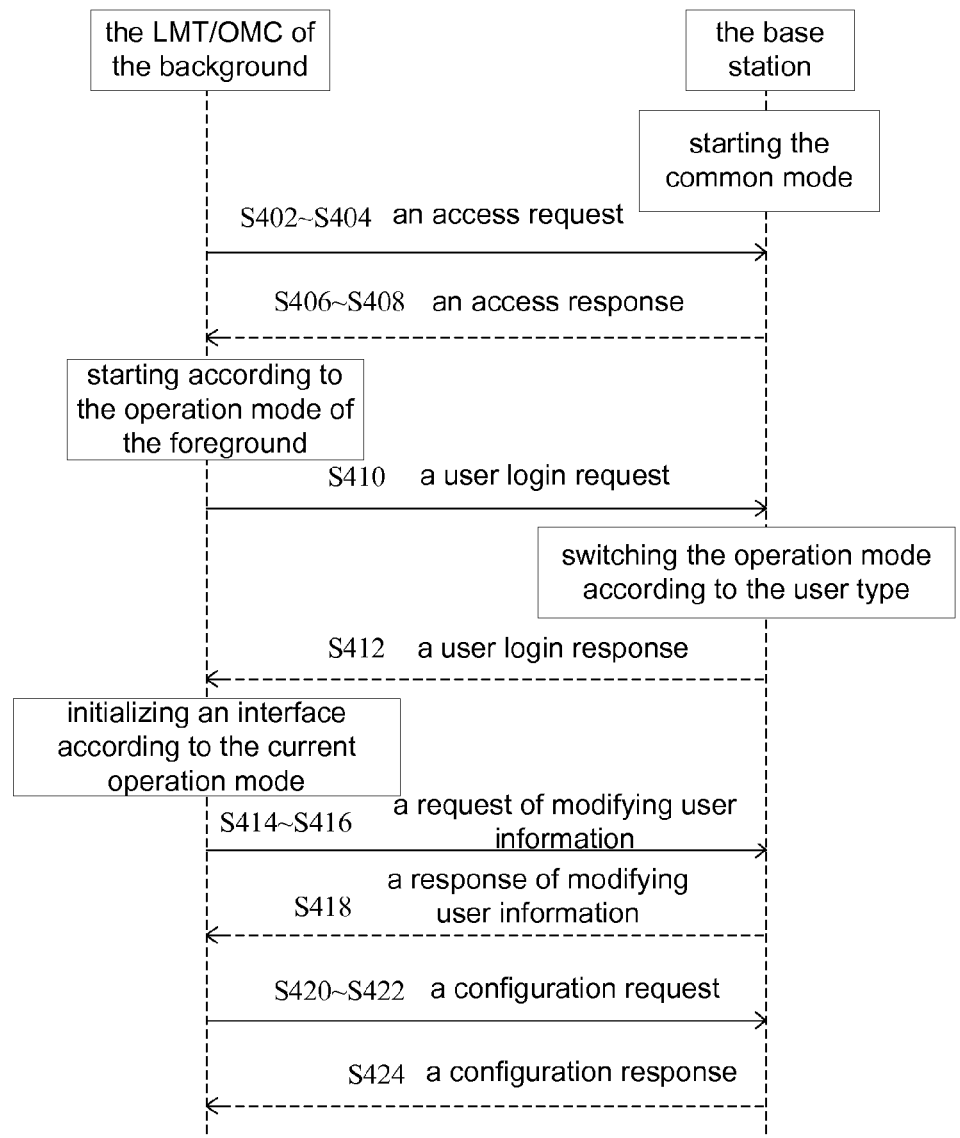
FIG. 4 shows a schematic diagram of a time sequence of an interaction between a foreground and a background according to a preferred embodiment of the present invention.

FIG. 4 shows a schematic diagram of a time sequence of an interaction between a foreground and a background according to a preferred embodiment of the present invention. The interaction specifically comprises the following steps.

Step S402, a base station is started in a default operation mode, wherein the default operation mode of the starting is a common mode wherein when starting, the base station is loaded with user information and the other data thereon of two operation modes.

Step S404, after starting, the base station allows an access of the background. The foreground receives an access request message sent by the background, and then the foreground judges whether to allow the access according to a safety strategy.

Step S406, if the access is allowed, the foreground sends to the background the data along with the current operation mode of the base station; and if the access is not allowed, the foreground sends an error message to the background and the background is failed to access.

Figure 5:
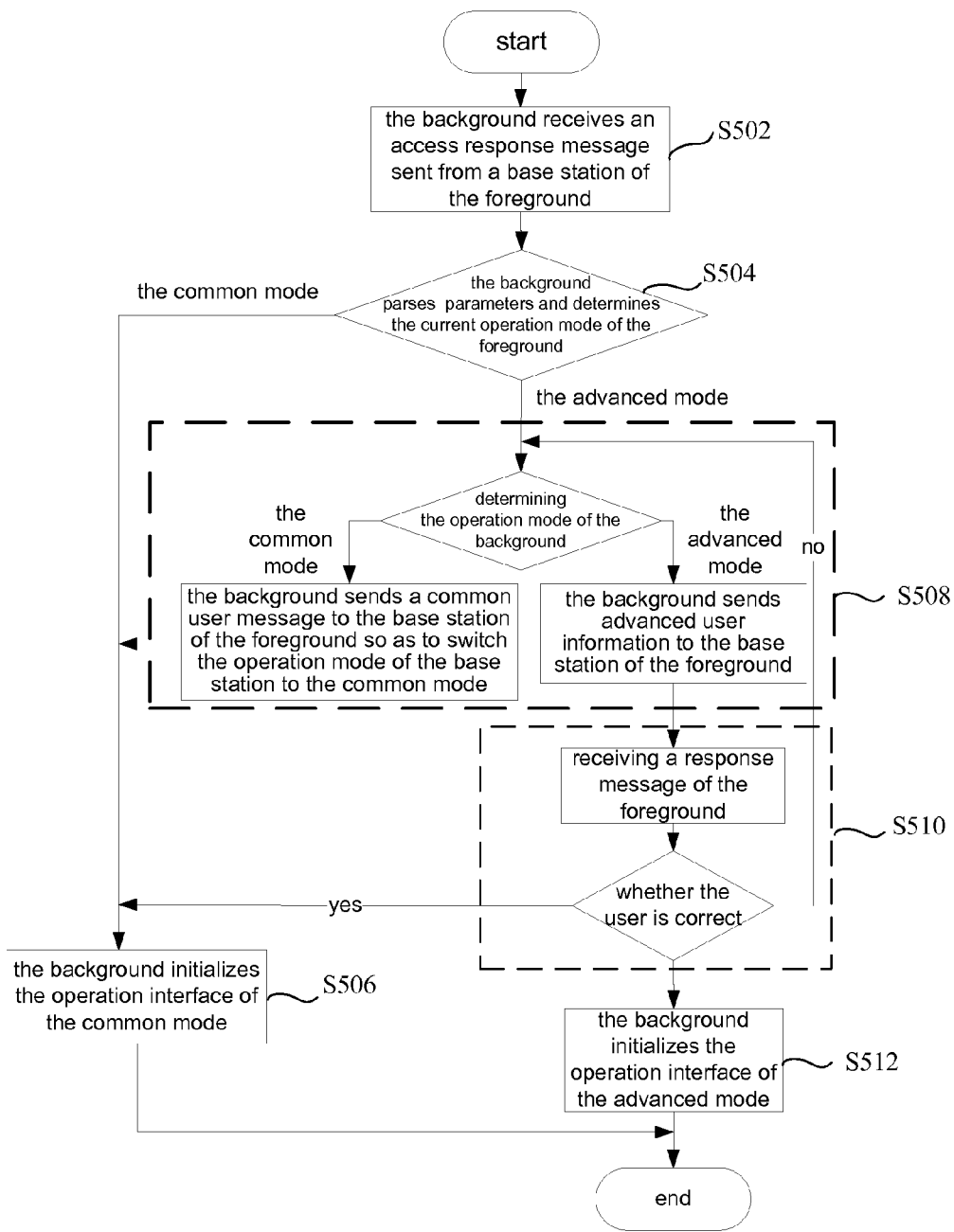
FIG. 5 shows a flowchart of an initialization after a background receives an access request response message according to a preferred embodiment of the present invention.

Step S408, after accessing successfully, the background starts a corresponding operation mode according to the operation mode of the foreground, wherein FIG. 5 is referred to for the initialization flow after the background receives the successful message.

Step S410, the base station of the foreground receives a user login request message from a LMT or an OMC of the background, then the foreground judges whether to switch the operation mode according to user type and user information of the background, to make the operation mode of the base station of the foreground consistent with that of the LMT or the OMC of the background.

Step S412, the foreground sends a user login response message to the background, and the background initializes an operation interface according to the operation mode.

Step S414, operators of the background can modify the user information according to requirements, wherein a common user does not require a password. In an advanced mode, the information of a common user and an advanced user can be modified, wherein the information includes user name and password, while in the common mode, only the information of the common user can be modified.

Step S416, the base station receives a request of modifying the user information from the LMT or the OMC of the background.

Step S418, the base station of the foreground modifies the user information according to the request from the background, and sends a response message to the background.

Step S420, the operator of the background performs configuration and management on the base station of the foreground according to the current interface.

Figure 6:
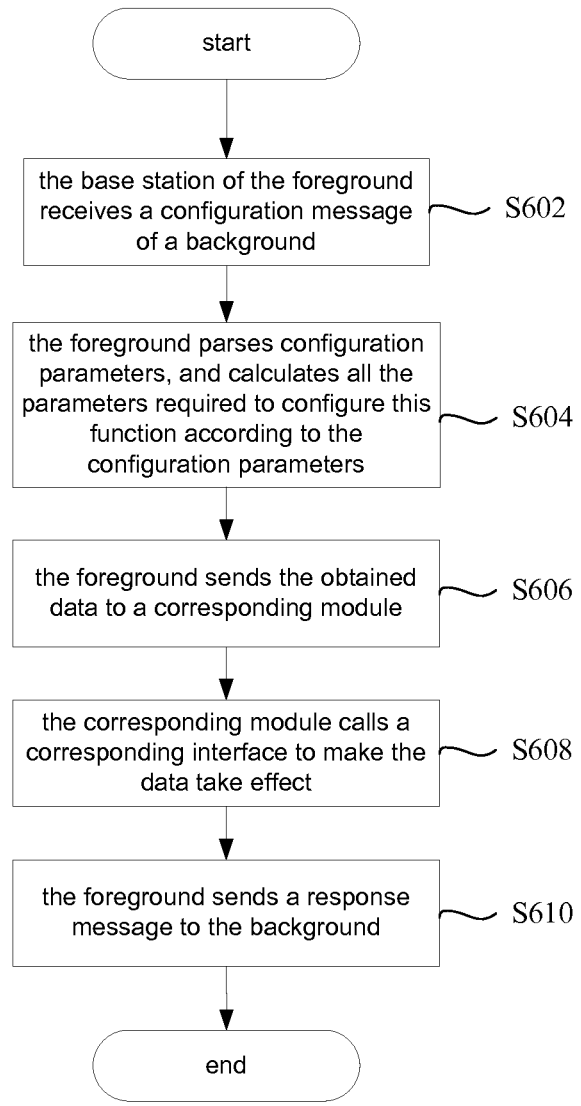
FIG. 6 shows a flowchart of management of a base station configuration in a common mode according to a preferred embodiment of the present invention.
Figure 7:
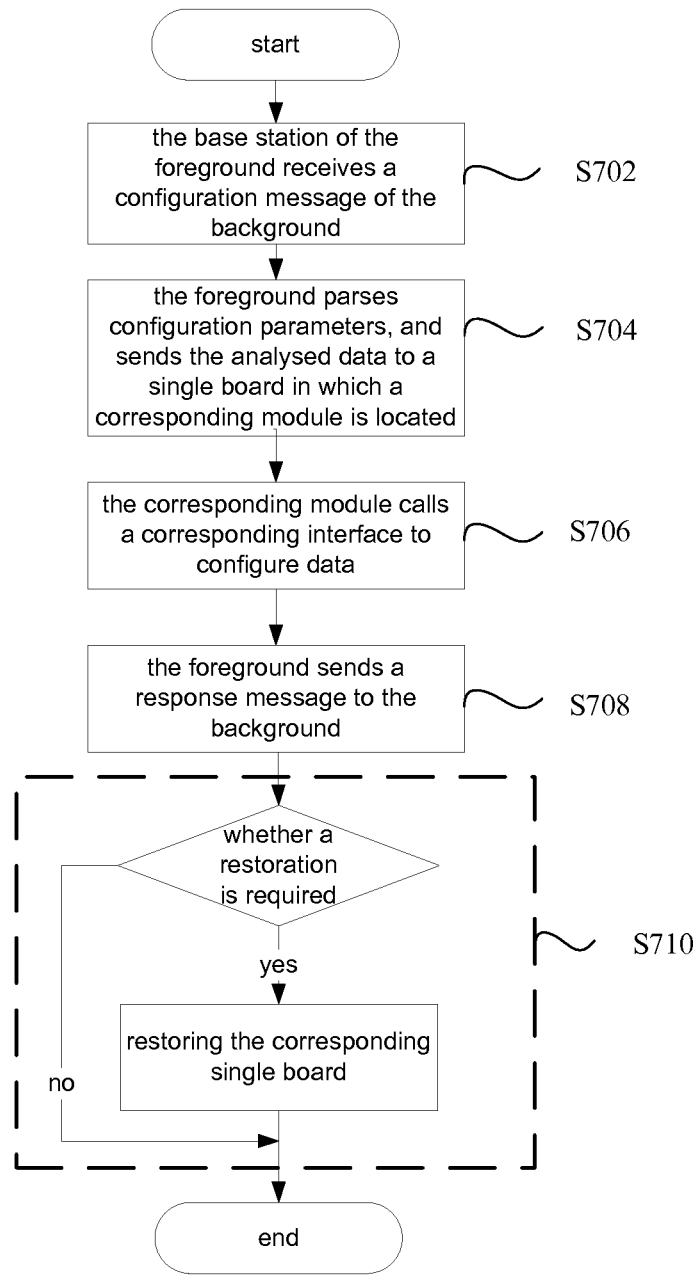
FIG. 7 shows a flowchart of management of a base station configuration in an advanced mode according to a preferred embodiment of the present invention.

Step S422, the base station of the foreground accomplishes the corresponding configuration according to a configuration message, wherein FIG. 6 is referred to for a flow of a configuration of the foreground in the common mode; and FIG. 7 is referred to for a flow of a configuration of the foreground in the advanced mode.

Step S424, the configuration and management process is ended.

FIG. 5 shows a flowchart of an initialization after a background receives an access request response message according to a preferred embodiment of the present invention. The flow specifically comprises the following steps.

Step S502, a LMT or an OMC of the background receives the access request response message sent from a foreground.

Step S504, the background parses parameters sent from a base station of the foreground and obtains the current operation mode of the foreground.

Step S506, if the foreground runs in a common mode, the background directly initializes an operation interface of the common mode.

Step S508, in the case that the foreground runs in an advanced mode, if the operator of the background selects a common user, the background sends a message to the foreground so as to switch the operation mode of the foreground to the common mode, and the background is initialized into the common mode; and if the operator of the background selects an advanced user, a user name and a password are input and sent to the foreground.

Step S510, if the background receives a message of the user information being incorrect from the foreground, the operator can continue to input the advanced user information and send it to the foreground; and if the common user is selected by a user, a common mode request can be sent to the foreground to switch the foreground to the common mode.

Step S512, if the foreground verifies the user information successfully, the foreground will respond to the background, then the background initializes an advanced user interface; and the initialization flow is ended.

FIG. 6 shows a flowchart of management of a base station configuration in a common mode according to a preferred embodiment of the present invention. The flow specifically comprises the following steps.

Step S602, a foreground runs in a common mode, and receives a configuration request message sent from a LMT or an OMC of a background.

Step S604, a base station of the foreground parses configuration parameters, and calls according to a configuration type and the configuration parameters a corresponding algorithm to calculate all the parameters required to configure this function.

The configuration and management process will be described in detail hereinafter, by taking as example the addition of a single board.

Step 1, the background adds a single board of a certain type in a certain slot, and sends a configuration message to the foreground.

Steps 2, the parameters that the background configures for the foreground include a single board type and physical location information of the single board.

Step 3, the foreground calculates an IP and MAC address of the single board according to the physical location information of the single board.

Step 4, the foreground is loaded with default function list parameters according to the single board type.

Step 5, the foreground generates a name of software required by the single board according to the function list parameters.

Step 6, software is loaded for the single board according to the generated name of the software so as to enable the single board to operate normally.

Step S606, the foreground sends the parameters to a corresponding module according to a configuration type.

Step S608, after receiving the parameters, the corresponding module calls an interface function of physical layer to enable the data to take effect.

Step S610, according to the successful or failed result of Step S608, a response message is sent to the background; the base station configuration in the common mode is finished.

FIG. 7 shows a flowchart of management of a base station configuration in an advanced mode according to a preferred embodiment of the present invention. The flow specifically comprises the following steps.

Step S702, a foreground runs in an advanced mode, and receives a configuration request message sent from a LMT or an OMC of a background.

Step S704, a base station of the foreground parses configuration parameters, and sends them to a corresponding module.

Step S706, after receiving the parameters, the corresponding module performs a data configuration.

Step S708, the base station of the foreground sends a response message to the background.

Step S710, the base station judges whether the single board requires to be restored, wherein if requires, the single board is restored to enable the data to take effect; otherwise, the newly configured data is used directly; and the base station configuration in an advanced mode is finished.

Figure 8:
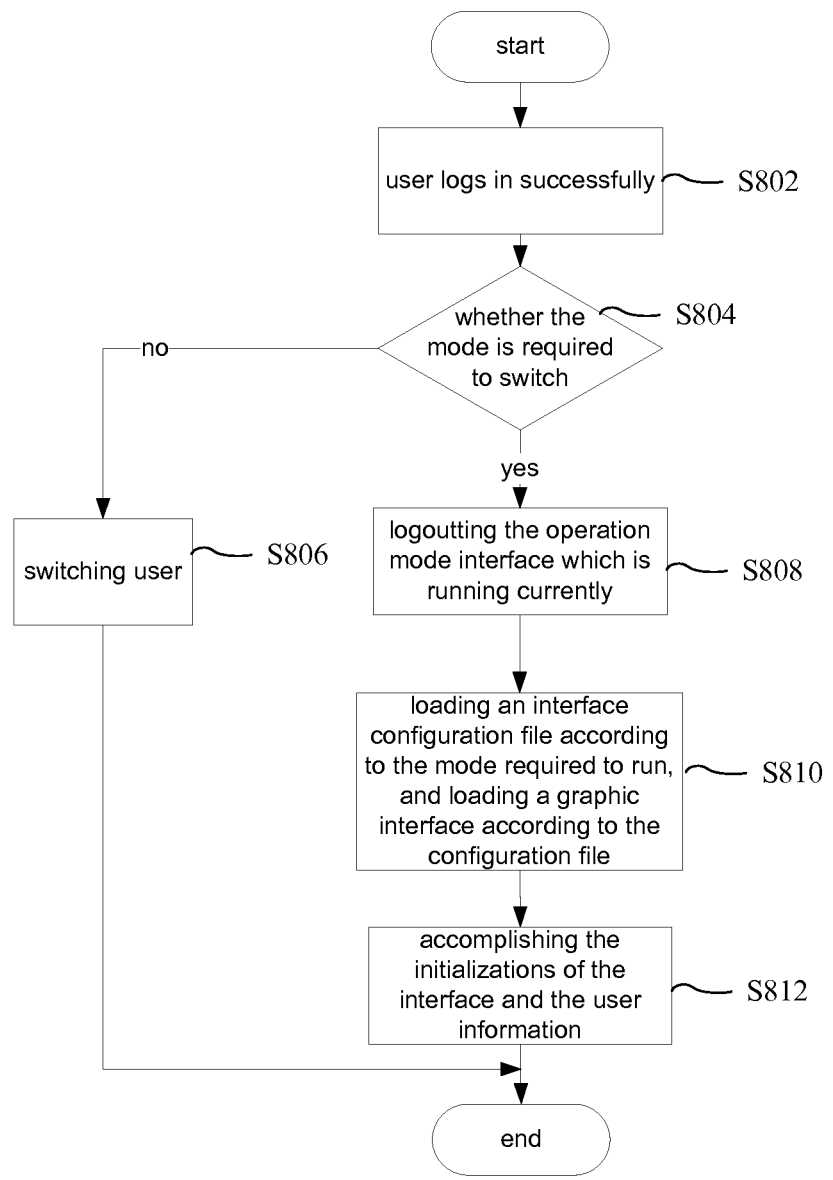
FIG. 8 shows a flowchart of a user interface switch during an operation process according to a preferred embodiment of the present invention.

FIG. 8 shows a flowchart of a user interface switch during an operation process according to a preferred embodiment of the present invention. The flow specifically comprises the following steps.

Step S802, during a running process, a background selects user login function to perform user login.

Step S804, after user logs in, it is judged whether an operation mode is changed, wherein if not, it enters Step S806; and if the operation mode requires to be switched, it enters Step S808.

Step S806, user is directly switched, and an operation interface is kept unchanged; then the flow is ended.

Step S808, the operation interface which is running is logout, and an interface re-initialization flow is entered.

Step S810, a corresponding configuration file of an operation interface is loaded according to the operation mode, and a graphic interface is loaded according to the configuration file.

Step S812, the graphic operation interface and user information are initialized according to the configuration file; the background user switch is accomplished.

To sum up, by the embodiments of the present invention, two different management operation modes including a common mode and an advanced mode for a base station are provided, wherein the configuration and management for the base station in the common mode reduces the cost and difficulty of the daily maintenance of the base station; and in the advanced mode, a configuration for all the changeable parameters of the base station can be performed, so as to enable the base station to operate in a special or optimized configuration, thereby solving the problem in the related art that the maintenance cost is increased due to the increased maintenance difficulty which is caused by the indefinite authority over the management of the base station configuration, reducing the work of the common maintenance personnel, improving the work efficiency of the common maintenance personnel, saving the cost of operation and maintenance, and strengthening the management of the senior configuration and management personnel for the base station, and further optimizing the data of the base station.

The description above is only the preferred embodiments of the present invention and not intended to limit the present invention. For those skilled in the art, various modifications and changes can be made to the present invention. Any modification, equivalent substitute and improvement within the spirit and principle of the present invention should be included in the protect scope of the present invention.

What is claimed is:

1. A method for managing a base station configuration, comprising the following steps of:
    acquiring identity information of a user;
    selecting an operation mode corresponding to the identity information, wherein the operation mode comprises a common mode and an advanced mode; and
    prompting the user to configure and manage configuration parameters of a base station in the operation mode;
    wherein before the step of acquiring the identity information of the user, the method further comprises:
    the base station being started in the common mode or the advanced mode; and
    a Local Maintenance Terminal (LMT) or an Operation Maintenance Center (OMC) accessing the base station.

2. The method according to claim 1, wherein before the step of the LMT or the OMC accessing the base station, the method further comprises:
    after receiving an access request message from the LMT or the OMC, the base station judging whether to allow the LMT or the OMC to access according to a safety strategy.

3. The method according to claim 1, wherein the step of selecting an operation mode corresponding to the identity information comprises:
    the LMT or the OMC selecting the operation mode corresponding to the identity information of the user according to the identify information; and
    the base station determining whether the operation mode thereof is consistent with the operation mode of the LMT or the OMC, wherein if not, the base station switches the operation mode thereof to the operation mode of the LMT or the OMC.

4. The method according to claim 1, wherein in the common mode, configuring daily maintenance parameters is allowed; and in the advanced mode, configuring all changeable parameters or functions is allowed.

5. The method according to claim 1, wherein the step of the base station being started in the common mode or the advanced mode comprises:
    the base station being loaded with the identity information and configuration parameters corresponding to the identity information in the common mode and the advanced mode.

6. An apparatus for managing a base station configuration, comprising:
    an acquisition module, adapted to acquire identity information input by a user;
    a selection module, adapted to select an operation mode corresponding to the identity information;
    an operation module, adapted to prompt the user to configure and manage configuration parameters of a base station in the operation mode;
    a receipt module, adapted to, after the base station is started in a common mode or an advanced mode, receive an access request message from a Local Maintenance Terminal (LMT) or an Operation Maintenance Center (OMC);
    an access module, adapted to, in the case that the receipt module receives the access request message, access the LMT or the OMC according to a safety strategy; and
    a switch module, adapted to, in the case that an operation mode of the LMT or the OMC is inconsistent with the operation mode of the base station, switch the operation mode of the base station to the operation mode of the LMT or the OMC.

7. The apparatus according to claim 6, wherein the selection module is further adapted to, in the case that the operation mode is a common mode, allow configuring daily maintenance parameters; and in the case that the operation mode is an advanced mode, allow configuring all changeable parameters or functions.

* * * * *